United States Patent
Maeda et al.

(10) Patent No.: US 6,401,599 B1
(45) Date of Patent: Jun. 11, 2002

(54) AUTOMATIC BREAD MAKER

(75) Inventors: Toshikatsu Maeda; Akihisa Nakano, both of Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/763,979

(22) PCT Filed: Jun. 29, 1999

(86) PCT No.: PCT/JP99/03503
§ 371 (c)(1),
(2), (4) Date: May 7, 2001

(87) PCT Pub. No.: WO01/00072
PCT Pub. Date: Jan. 4, 2001

(51) Int. Cl.⁷ .............................. A21B 1/00; A47J 27/00; A47J 27/21; A47J 37/01; A47J 37/06
(52) U.S. Cl. .............................. 99/327; 99/331; 99/342; 99/348; 99/468; 366/98; 366/146; 366/314
(58) Field of Search .............................. 99/325–333, 342, 99/337, 338, 348, 352–355, 467, 468, 483, 484, 486; 366/69, 96–98, 144–147, 314, 601; 426/504, 512; 219/492, 497, 400, 494; 700/90

(56) References Cited

U.S. PATENT DOCUMENTS

| | | | | |
|---|---|---|---|---|
| 4,538,509 A | * | 9/1985 | Ojima et al. ................... 99/348 |
| 4,984,512 A | * | 1/1991 | Takahashi et al. ............. 99/327 |
| 5,076,153 A | * | 12/1991 | Takahashi et al. ....... 366/601 X |
| 5,145,252 A | * | 9/1992 | Oh ................................ 366/98 |
| 5,146,840 A | * | 9/1992 | Hedenberg .................... 99/328 |
| 5,363,746 A | * | 11/1994 | Gordon ..................... 99/455 X |
| 5,415,081 A | * | 5/1995 | Yoshida et al. ................ 99/326 |
| 5,584,230 A | * | 12/1996 | Yoshida et al. ......... 366/314 X |
| 5,628,240 A | * | 5/1997 | Yoshida et al. ........... 99/468 X |
| 5,694,832 A | * | 12/1997 | Kakimoto et al. ............. 99/348 |
| 5,704,277 A | * | 1/1998 | Yung ............................. 99/327 |
| 5,794,521 A | * | 8/1998 | Yung ....................... 366/146 X |
| 5,839,356 A | * | 11/1998 | Dornbush et al. ............. 99/331 |

FOREIGN PATENT DOCUMENTS

| | | |
|---|---|---|
| JP | 2-34123 | 5/1990 |
| JP | 08-187182 | 7/1996 |
| JP | 08-187183 | 7/1996 |
| JP | 08-191760 | 7/1996 |
| JP | 08-215058 | 8/1996 |
| JP | 09-140574 | 6/1997 |

OTHER PUBLICATIONS

Japanese search report for PCT/JP00/00956 dated Sep. 7, 1999.
English translation of Form PCT/ISA/210, Undated.

* cited by examiner

Primary Examiner—Timothy F. Simone
(74) Attorney, Agent, or Firm—Ratner & Prestia

(57) ABSTRACT

The present invention relates to an automatic bread maker for home use, and particularly relates to methods of displaying during the bread making cycle. The automatic bread maker of the present invention comprises: a baking chamber with a heater, a baking pan disposed inside the baking chamber, a kneading blade disposed in the baking pan, a motor which drives the kneading blade, a controller which controls the heater and the motor, an input means for inputting cooking conditions, and a display which displays a time remaining before the time to add additional ingredients and the actual time to add the ingredients. The display shows the remaining time or the actual time to add the ingredients. Therefore, the user can clearly confirm when to add additional ingredients, and can prepare the ingredients accordingly.

13 Claims, 7 Drawing Sheets

Step 1

30 min. after Start

Step 2

Step 3

Raisin input time SW ON

Step 4

AUTOMATIC BREAD MAKER

THIS APPLICATION IS A U.S. NATIONAL PHASE APPLICATION OF PCT INTERNATIONAL APPLICATION PCT/JP99/03503.

BACKGROUND OF THE INVENTION

In recent years, automatic bread makers for home use became popular in the market. According to demands for automatic bread makers capable of making different kinds of bread, bread makers which can bake raisin bread became available.

In the case of such bread makers, the dough has conventionally been kneaded in the process shown in FIG. 9.

In a kneading process 1, a motor drives a kneading blade for 7 to 10 minutes depending on the temperature detected by a temperature sensor. To describe more specifically, dough is kneaded for 7 minutes in the kneading process 1. Then, when the temperature sensor detects that the temperature of the dough has risen to 35° C.(the threshold temperature for kneading to stop) the kneading process 1 is terminated. If the dough does not reach the threshold temperature within 10 minutes, the kneading process 1 stops regardless. When the kneading is stopped sometime between 7 and 10 minutes, an alarm sounds to notify the user to add raisins. Kneading is suspended for 3 minutes, to allow users to add raisins. Then, the kneading process 2 starts in order to mix the raisins. The kneading process then continues for 2 minutes.

However, as has been the case with the prior art, a simple notification of the time for adding raisins is not enough, since the user may miss the alarm if he/she is not attending to the bread maker during the several seconds in which the alarm is sounding. Normally, raisins can be put into the bread maker only during a limited time slot in the kneading process. Therefore, if the user misses the alarm, he/she has missed the chance to put raisins into the bread maker, making it impossible to make raisin bread. Since the period of the kneading process depends on the ambient temperature, the time for adding raisins changes, making it difficult to know exactly when the alarm will sound.

DISCLOSURE OF THE INVENTION

To address the foregoing problems, the automatic bread maker of the present invention comprises:
a) a baking chamber with a heater;
b) a removable baking pan disposed in the baking chamber;
c) a kneading blade disposed inside the baking pan;
d) a motor which drives the kneading blade;
e) a controller which controls the heater and the motor;
f) an input means for inputting baking conditions; and
g) a display for displaying a cooking time or a finishing time.

The display shows
i) a time remaining before adding additional ingredients; and
ii) an actual time to add the ingredients.

The present invention allows the user to know when to add the additional ingredients and to prepare the ingredients according to the time remaining.

The display of the present invention indicates, during a predetermined period immediately after the start of the bread making cycle, the time remaining before adding additional ingredients or the actual time to add the ingredients. More specifically, the display of the present invention accurately shows an appropriate time for adding the additional ingredients for a predetermined period immediately after the start of the baking process, and then displays the time remaining before the completion of the bread making cycle or when the bread making cycle finishes. In other words, the display automatically switches back to the normal display after the user confirms when the additional ingredients are needed.

Further, the display of the present invention allows the user to confirm an exact time for adding the ingredients by operating a switch anytime during the bread making cycles.

The display of the present invention is capable of indicating when the bread making cycle finishes and when to add the additional ingredients, and the user can precisely confirm such times anytime.

Since the automatic bread maker of the present invention also includes a temperature sensor which detects the temperature of the dough in the baking pan, a period of the time between the start of the kneading process and the time to add the additional ingredients can be fixed regardless of differences in temperatures such as a room temperature.

The automatic bread maker of the present invention further includes a temperature sensor which detects the room temperature, and according to the room temperature detected by the sensor immediately after the start of the bread making cycle, selects a bread making program from a plurality of bread making programs.

The foregoing functions of the present invention allow users to successfully bake a variety of breads at home.

DETAILED DESCRIPTION OF THE PREFERRED EMBODIMENTS

The First Preferred Embodiment

Figure 1:
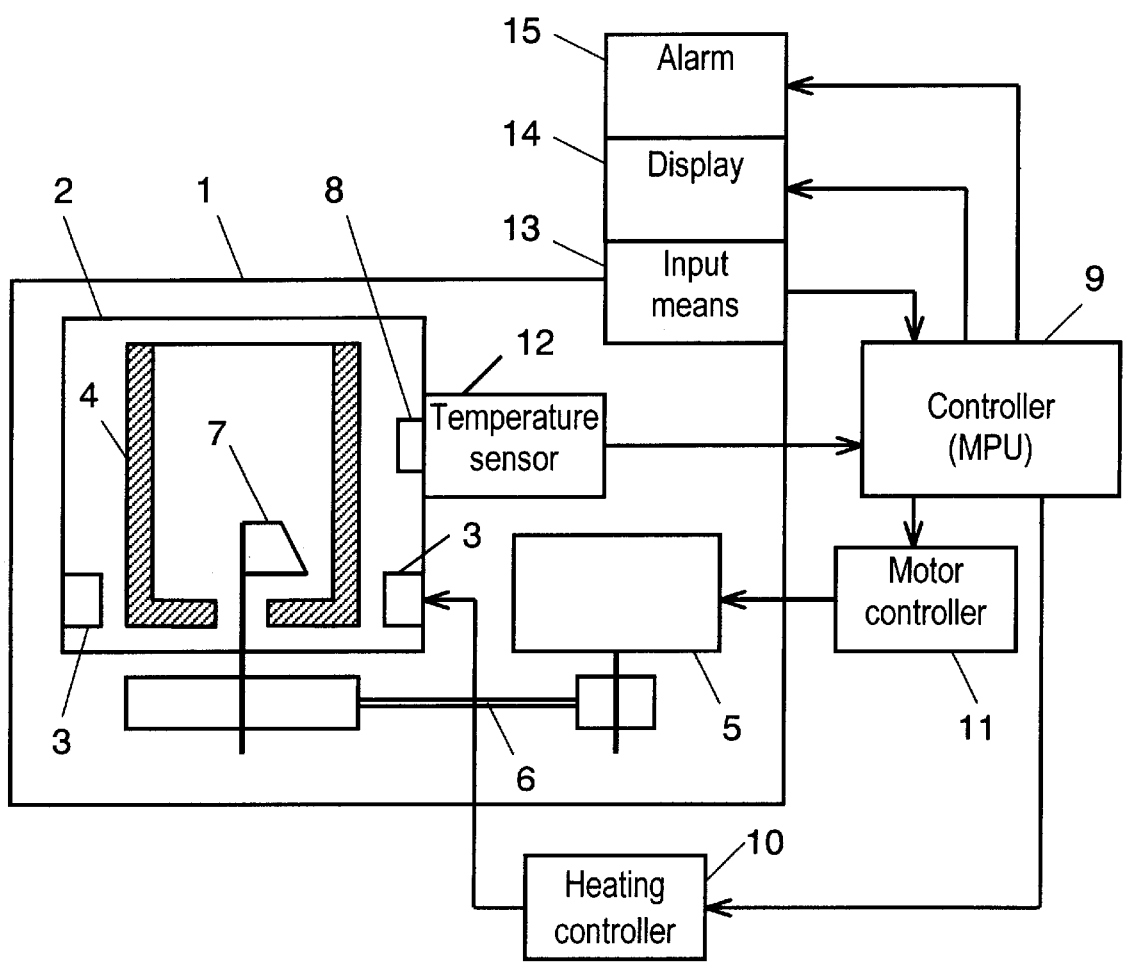
FIG. 1 is a block diagram illustrating an automatic bread maker of the present invention.

The first preferred embodiment of the present invention is described below with reference to FIGS. 1 to 4. FIG. 1 is a block diagram illustrating the automatic bread maker of the present embodiment.

The description begins with the construction of the automatic bread maker. Inside a main body 1 is a baking chamber 2 having a heater 3 mounted therein. A baking pan 4 is placed inside the baking chamber 2 in a manner allowing it to be removable, and is heated electrically by the heater 3. A motor 5 drives a kneading blade 7 mounted at the bottom of the baking pan 4 via a belt 6. During the bread making cycle, a temperature sensor 12 comprising a thermistor 8 detects the temperature of dough and sends temperature information to a controller 9. If the controller 9 finds that the detected temperature is lower than a predetermined bread making control temperature, a heating controller 10 applies electric current to the heater 3. When the duration measured by the controller 9 exceeds a predetermined period, a motor controller 11 applies electric current to the motor 5 to initiate a kneading or a punching process. The controller 9 activate a display 14 and an alarm 15 respectively in order to indicate the time remaining before an appropriate time for adding additional ingredients or before the bread making cycles finish and to notify of the completion of the bread making cycle and the time to add the additional ingredients.

Figure 2:
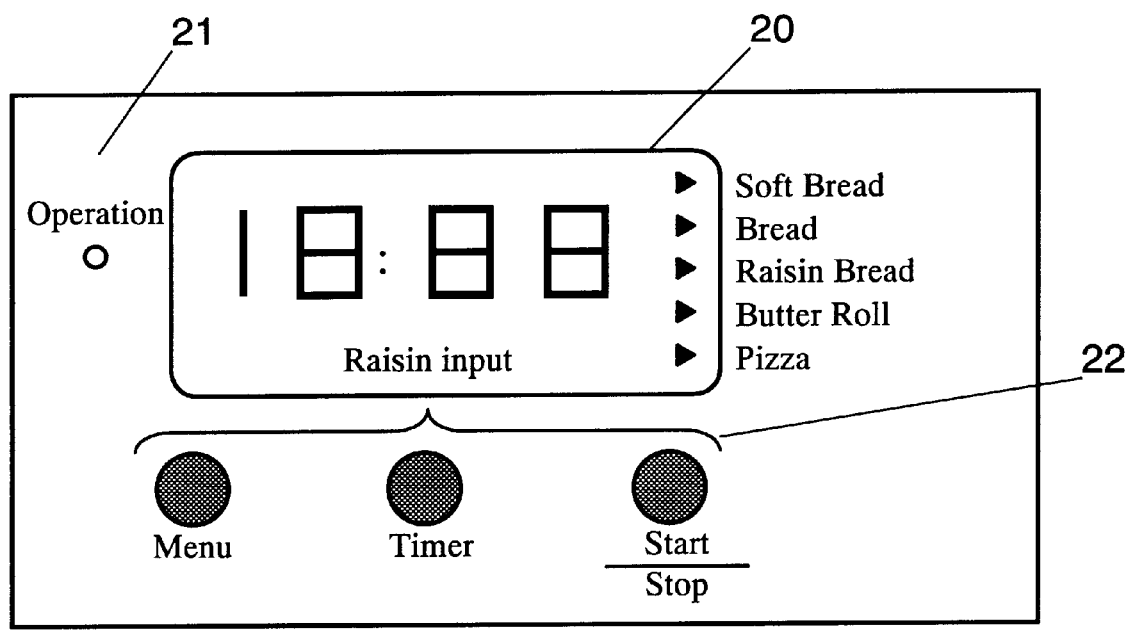
FIG. 2 shows an input means and a display of an automatic bread maker of a first preferred embodiment of the present invention.

Construction of the input means 13 and the display 14 are described with reference to FIG. 2. In FIG. 2, all the segments of the liquid crystal of a liquid crystal display 20 (hereinafter, LCD) are lit. A light emitting diode 21 (hereinafter, LED) is lit during baking, is blinking while bread is kept warm after baking, and is off at other times. Push buttons 22 comprise a menu switch, a timer switch, and a start/stop switch. The menu switch is for setting cooking programs, the timer switch, setting the cooking time, and the start/stop switch for starting and stopping the bread making cycles.

Figure 3:
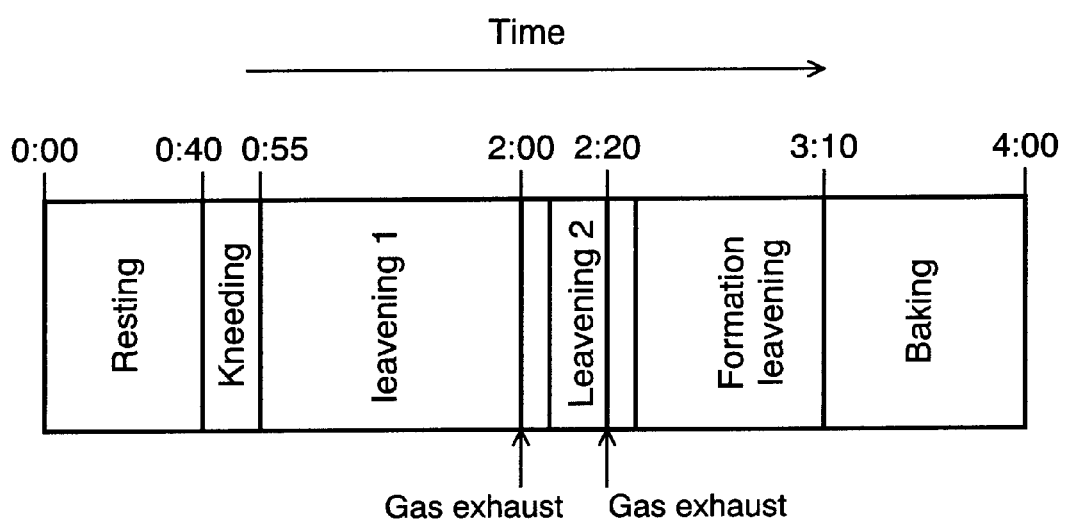
FIG. 3 is a flow chart of a bread making cycle of automatic bread makers in accordance with first to fourth preferred embodiments of the present invention.

In the case of the automatic bread maker with the foregoing construction, raisin bread is made according to the bread making process shown in FIG. 3. The automatic bread maker of this embodiment bakes raisin bread according to the bread making processes shown in FIG. 3.

Figure 4:
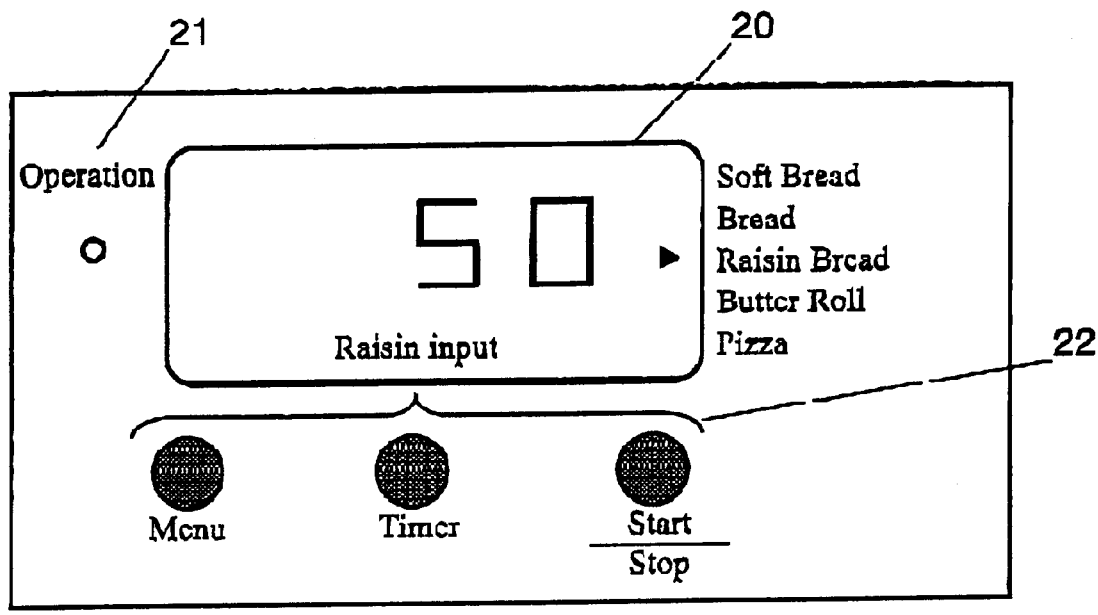
FIG. 4 shows an example of a display screen of the automatic bread maker in accordance with the first preferred embodiment of the present invention.
Figure 4:
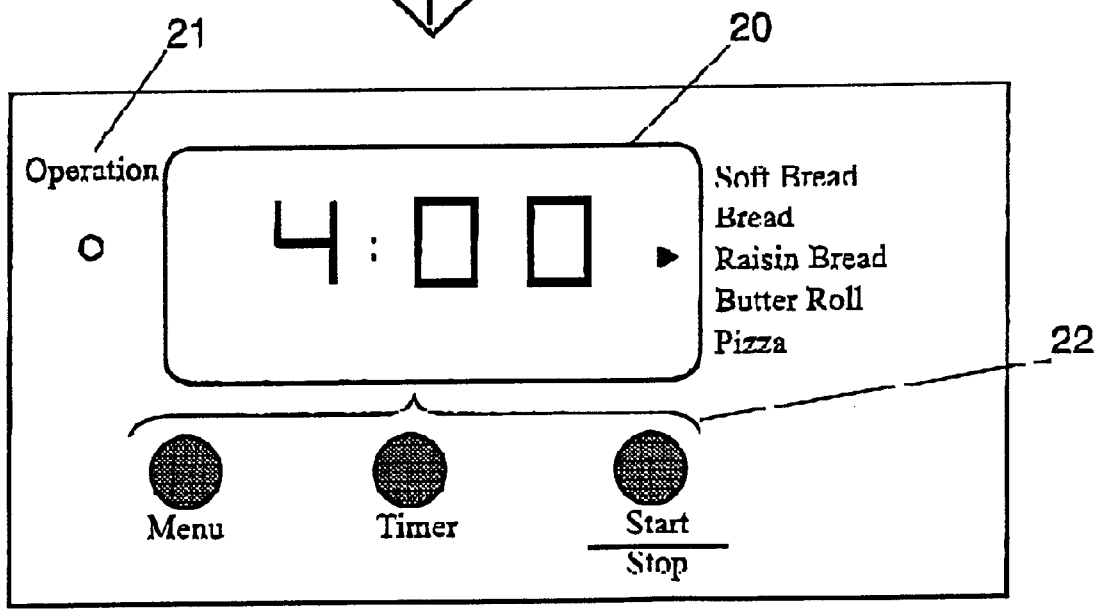

FIG. 4 shows an example of a display screen of the bread making processes of the automatic bread maker of this embodiment.

Step 1 shows a display screen of the display 14 when the start/stop switch of the push buttons 22 is pressed after raisin bread is selected. This display shows the screen immediately after the bread making cycle is started, and the LCD 20 indicates the time remaining before the time to add the raisins. In this case, raisins need to be added 50 minutes after the start of the bread making cycle. 30 seconds after Step 1, the display screen is switched to Step 2, and here, the LCD 20 indicates 4 more hours are required before all the bread making cycles for the raisin bread have been completed.

As has been described, the user can accurately know, immediately after the bread making cycle starts, when raisins need to be added, and can start preparing the ingredients after starting the bread making process without being rushed.

In this embodiment, the display screen switches from the time remaining before adding raisins in 30 seconds to the time remaining before completion of the bread making cycles. However, the switching period is not limited to 30 seconds. The switching period may be set to, for example, 5 seconds or 1 minute. In this embodiment, the time remaining before the time when the raisins need to be added is shown in the display However, the actual time to add the raisins may be alternatively displayed with a similar effect.

In this embodiment, raisins are used as an additional ingredient. Needless to say, however, other ingredients such as nuts (including walnuts) can be used as well.

The Second Preferred Embodiment

Figure 5:
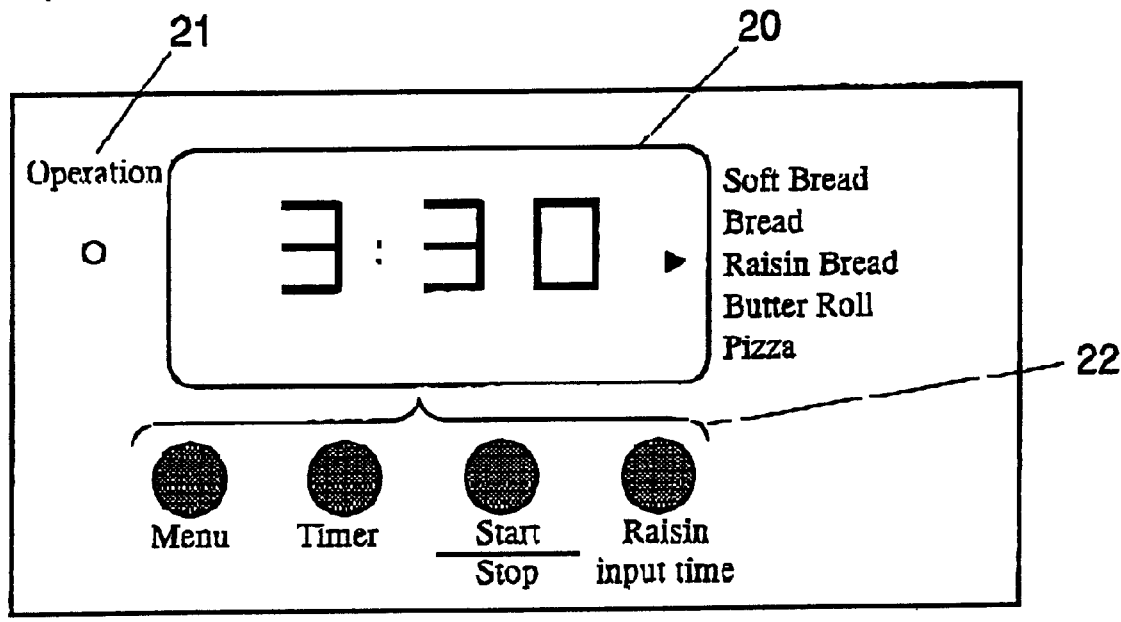
FIG. 5 shows an example of input means and a display screen of the automatic bread maker in accordance with the second preferred embodiment of the present invention.
Figure 5:
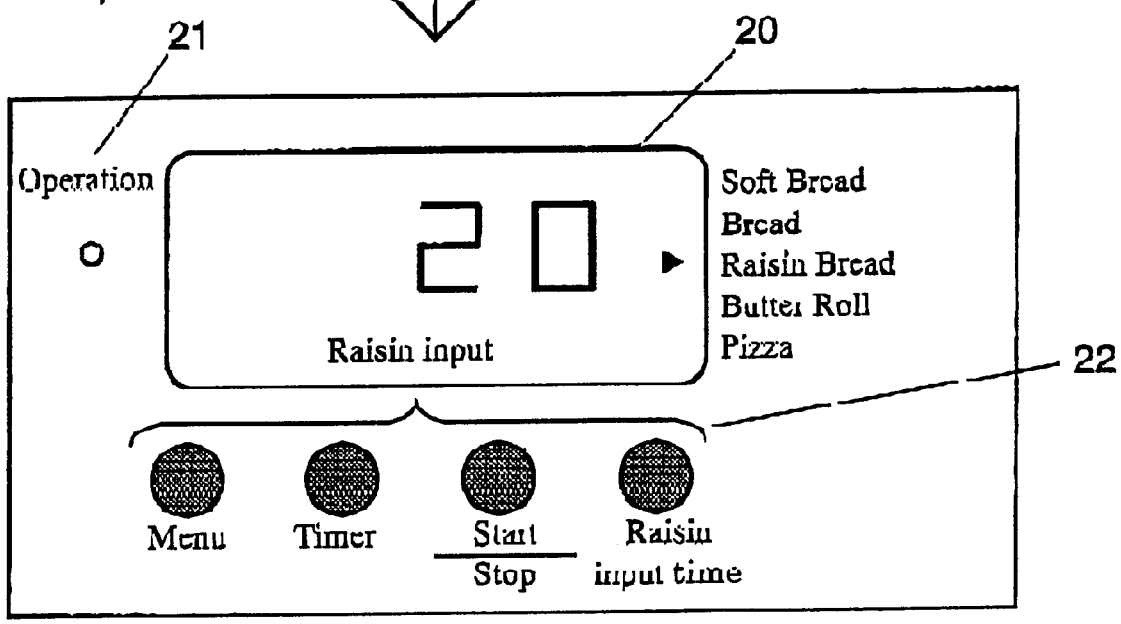

The second preferred embodiment of the present invention is described hereinafter. FIG. 5 shows the input means 13 and an example of a display screen.

Step 3 shows a display screen of the display 14, 30 minutes after the bread making cycle is started by the start/stop switch of the push buttons 22 after raisin bread is selected. If the user presses a raisin-addition-time switch of the push buttons 22 to confirm the time remaining before adding raisins, the display screen is switched for 10 seconds to Step 4, and notifies the user that raisins should be added in 20 minutes.

In this embodiment, the display screen of Step 4 is displayed for 10 seconds after the raisin-addition-time switch is pressed, however, it is not limited to this period, and can be set, for example, at 5 seconds or 1 minute.

It is also possible to set the display such that the Step 4 display screen is shown only while the raisin-input-time switch of the push buttons 22 is pressed. In this case, the user can be clearly informed of and confirm while he/she is pressing the switch that the time indicated in the display is the time remaining before the time to add raisins. Therefore, the user will not confuse the remaining time before raisins are added with the remaining time before the bread making cycles finish.

As has been described, according to the present embodiment, the time remaining before the time to add raisins can be confirmed anytime during the bread making cycles, and the user can prepare raisins in accordance with the time remaining. In this embodiment, a display screen switch button, the raisin-input-time switch, is added independently. However, the function of this switch can be added to other switches. For example, if the function is added to the timer switch, the user can confirm the time remaining by operating the timer switch during the bread making cycles.

This easily and inexpensively provides a merit similar to the first preferred embodiment without adding an extra switch.

In this embodiment, the time remaining before the time to add raisins is displayed. However, if the completion of bread making cycles is indicated by the actual time, the time to add raisins can accordingly be indicated by the actual time.

The Third Preferred Embodiment

Figure 6:
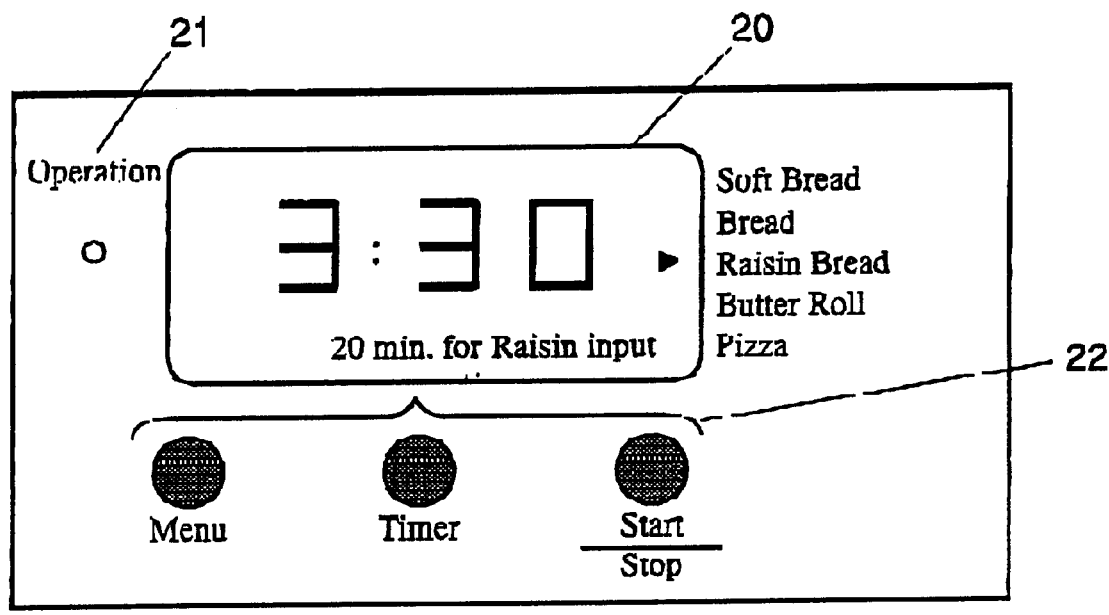
FIG. 6 shows an example of a display screen of the automatic bread maker in accordance with the third preferred embodiment of the present invention.

The third preferred embodiment of the present invention is described hereinafter. FIG. 6 shows an example of a display screen of the third preferred embodiment.

FIG. 6 shows the input means 13 and the display 14, 30 minutes after the bread making cycle is started by the start/stop switch of the push buttons 22 after selecting raisin bread. The LCD 20 is simultaneously displaying the time remaining before all the bread making processes are completed in large letters as "3 hours 30 minutes" and "add raisins in 20 minutes". This display screen allows the user to confirm when to add raisins by simply looking at the display.

Thus, the time remaining before the time to add raisins can be confirmed anytime during the bread making cycles, and the user can prepare raisins accordingly.

In this embodiment, the time to add raisins is indicated as time remaining However, it can alternatively be indicated by the actual time.

The Fourth Preferred Embodiment

Figure 7:
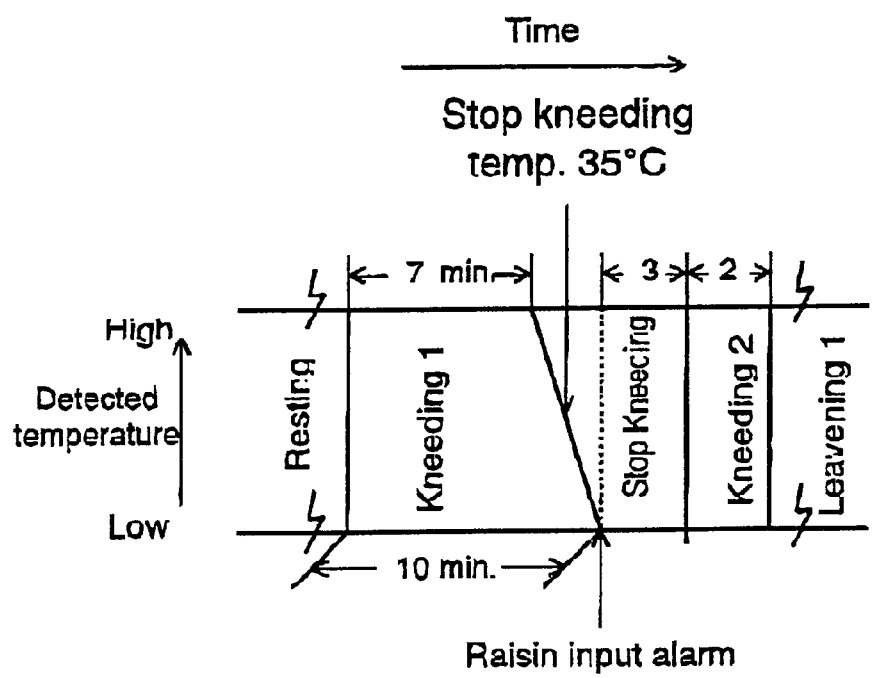
FIG. 7 is a process chart of a kneading process of the automatic bread maker in accordance with the fourth and fifth preferred embodiments of the present invention.

The fourth preferred embodiment of the present invention is described hereinafter. FIG. 7 focuses on the kneading process included in the process chart of the bread making cycles illustrated in FIG. 3. After starting the bread making cycle, when the resting process in FIG. 3 finishes, the kneading process starts.

In a kneading process 1, the motor 5 drives the kneading blade 7 to knead dough for 7 minutes. As the temperature of the dough rises, and the temperature sensor 12 detects that it has reached 35° C., the threshold temperature to stop kneading, the kneading process is suspended. On the other hand, if the temperature of the dough does not reach 35° C. in 10 minutes, the kneading process stops anyway. In other words, the kneading process 1 continues for 7–10 minutes. In this embodiment, if the kneading process stops earlier than 10 minutes as is the case shown in FIG. 7, the process is suspended until 10 minutes have elapsed, so that the time to add raisins consistently occurs at 10 minutes. At 10 minutes from the start of the kneading process, the alarm 15 alerts the user of the time to add raisins. The suspension of kneading then continues for 3 more minutes before the start of a 2-minute kneading process 2 in which raisins are mixed with the dough. In this manner, a period of the time between the start of the bread making cycle and the time to add raisins is fixed in one bread making cycle.

Figure 9:
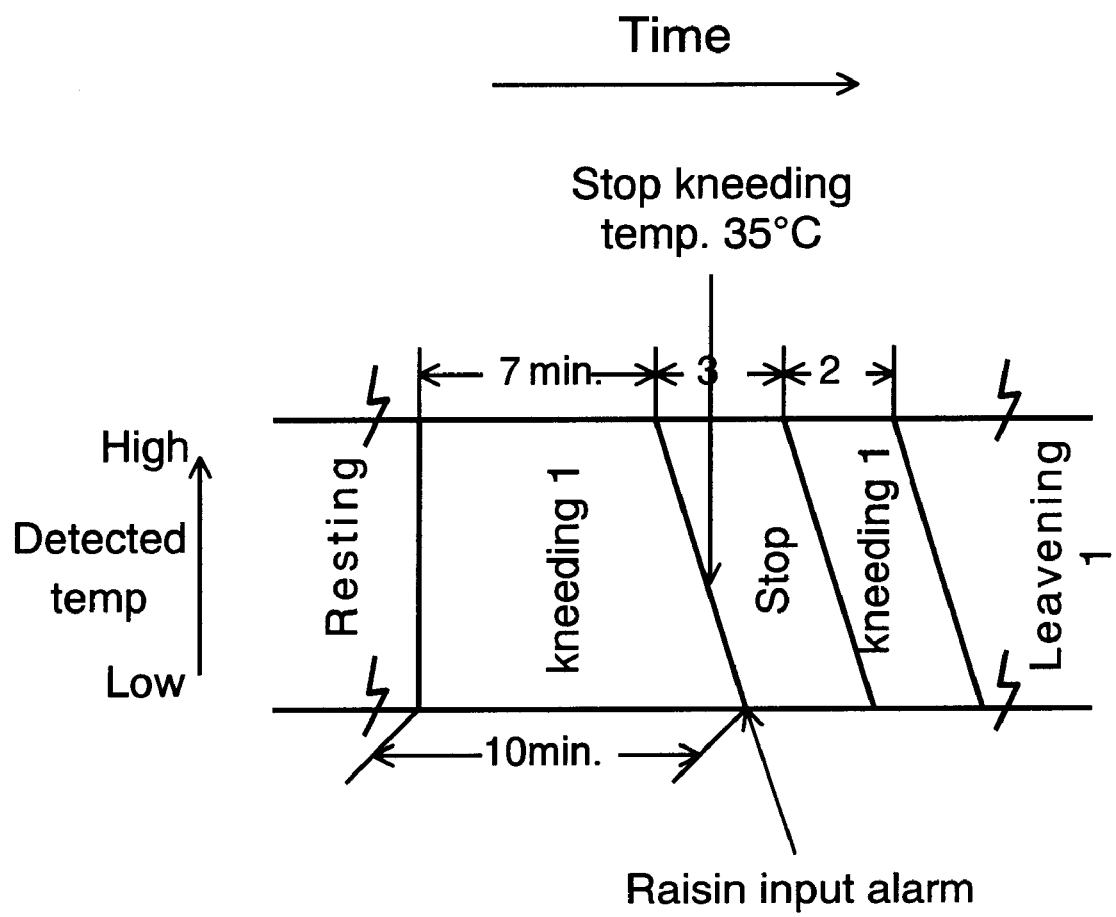
FIG. 9 is a process chart of a kneading process of a conventional automatic bread maker.

In the prior art, as shown in FIG. 9, the period of the suspension of the kneading for the purpose of adding raisins has been fixed at 3 minutes in order to shorten the suspension as much as possible regardless of the temperature of the dough. The reason why the period of the suspension in the prior arts is fixed is that it has been considered that if suspension of the kneading continues for a long time when temperature is high and the duration of kneading is short, the dough becomes loose and high-quality bread can not be made. However, the inventors of the present invention have conducted thorough experiments to determine the optimum temperature to initiate suspension of the kneading process, the period of the kneading process 2 and the amount of bread ingredients added. As a result of such efforts, the inventors of the present invention found that no major influence is observed in the bread making operation if the differences in period of the suspension is 5 minutes or less when the room temperature is at 25° C. or higher and 15 minutes or less, under 25° C.

As has been described, with the automatic bread maker of the present invention, even when the period of the kneading is not the same due to differences in temperatures, the period from the start of the kneading and the time to add raisins can be fixed.

In this embodiment, the kneading process 1 is set at 7–10 minutes and the kneading process 2, 2 minutes, however, it is not limited to this period, and depending on the construction of the bread maker, in some cases, the period could be set at other than the above.

The Fifth Preferred Embodiment

Figure 8:
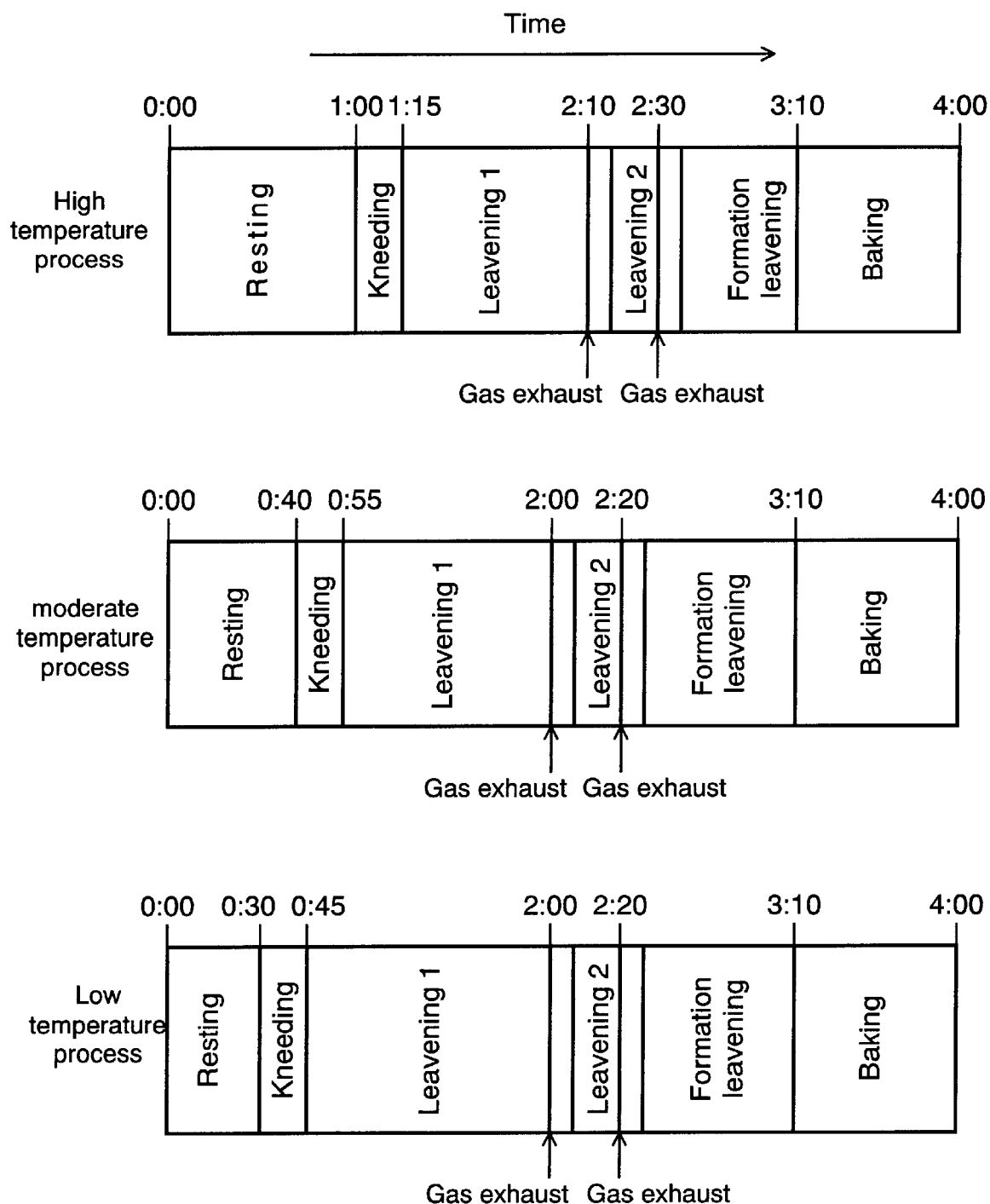
FIG. 8 is a process chart of the bread making cycle of the automatic bread maker of the fifth preferred embodiment of the present invention.

The following is the description of the fifth preferred embodiment of the present invention. FIG. 8 is a process chart of the bread making cycle of raisin bread. The automatic bread maker of this embodiment has a plurality of bread making programs in controller 9.

According to the present embodiment, if the temperature detected by the temperature sensor 12 immediately after the start of the bread making process is lower than 20° C., the bread making cycle starts in low temperature mode, 20° C.–28° C., moderate temperature mode, and 28° C. or higher, high temperature mode. The purpose of this function is to make a high-quality bread without being affected by differences in room temperature by shortening the leavening time when the temperature is high to avoid over-leavening, and when the temperature is low, by extending leavening time to avoid insufficient leavening. The kneading process of the present embodiment is the same as that of the fourth preferred embodiment, and the period before the time to add raisins is fixed.

In this embodiment, since the period of the bread making cycle is set at the start of the bread making cycle, the period before the time to add raisins can then be checked.

If the room temperature is 25° C. at the start of the bread making cycle, for example, the intermediate temperature mode is selected immediately after the start of the bread making cycle. Then, according to the bread making cycles of the intermediate temperature mode, bread ingredients are allowed to rest for 40 minutes before the kneading process. The time to add raisins is 5 minutes prior to the completion of the kneading process. In other words, the time to add raisins is 50 minutes after the start of this bread making cycle.

As has been described, even in the case of a bread making cycle comprising a plurality of processes, the period before the time for adding the raisins can be set and displayed immediately after the start of the bread making process.

INDUSTRIAL APPLICABILITY

As has been described, according to the automatic bread maker of the present invention, the following merits are obtained.

According to the present invention, the time remaining before the time to add raisins or the actual time to add raisins can be confirmed anytime during the bread making cycle, and the user can prepare raisins accordingly and will hopefully not fail to add raisins.

The display of the present invention can indicate the time remaining before the time to add raisins or the actual time to add raisins, therefore, the user can prepare the ingredients checking the time raisins need to be added. Since the user can confirm the time to add the additional ingredients by operating a switch anytime during the bread making cycle, the user will not miss the time to add the raisins.

The automatic bread maker of the present invention includes a temperature sensor which detects the temperature of the dough in the baking pan. This temperature sensor helps to fix the length of time from the start of the bread making cycle to the time to add the additional ingredients, and the user can prepare the ingredients at an appropriate time in full knowledge of the time remaining. The automatic bread maker of the present invention includes a temperature sensor and a plurality of bread making programs in the controller 9. Therefore, it can accurately display the period before the time for adding the ingredients immediately after the start of the bread making cycles. Due to the foregoing functions, the present invention allows users to make high-quality bread at home with a high degree of success.

In the foregoing descriptions, raisin bread has been taken up as an example. However, the automatic bread maker of the present invention can be applied to many other kinds of ingredients, and according to the ingredients, an appropriate bread making program can be set.

What is claimed is:

1. An automatic bread maker comprising;
   a) a baking chamber with a heater;
   b) a baking pan disposed inside said baking chamber;
   c) a kneading blade disposed inside said baking pan;
   d) a motor for driving said kneading blade;
   e) a controller for controlling said heater and said motor; and f) a display for displaying
one of a time remaining before ingredients are to be added and an actual time to add the ingredients.

2. The automatic bread maker of claim 1, wherein said display displays one of the time remaining before ingredients are to be added and the actual time to add the ingredients during a predetermined period after the start of a bread making cycle.

3. The automatic bread maker of claim 1, wherein said display displays one of the time remaining before ingredients are to be added and the actual time to add the ingredients during a predetermined period by operating a switch.

4. The automatic bread maker of claim 1, wherein said display displays one of the time remaining before ingredients are to be added and the actual time to add the ingredients by operating a predetermined switch.

5. The automatic bread maker of claim 1, further comprising a temperature sensor for detecting a temperature of a dough in said bread maker,
wherein, said time remaining before ingredients are to be added or said actual time to add ingredients are based on an output of said temperature sensor.

6. The automatic bread maker of claim 1, further comprising a temperature sensor for detecting room temperature
wherein, the automatic bread maker selects one of a plurality of internal bread making programs, and controls said display to display one of the time remaining before ingredients are to be added and the actual time to add the ingredients based on which of said programs are selected.

7. The automatic bread maker of claim 6, wherein suspension of kneading is for an amount of time inversely proportional to duration of kneading.

8. The automatic bread maker of claim 2, further comprising a temperature sensor for detecting a temperature of a dough in said bread maker,
wherein, said time remaining before ingredients are to be added or said actual time to add ingredients are based on an output of said temperature sensor.

9. The automatic bread maker of claim 3, further comprising a temperature sensor for detecting a temperature of a dough in said bread maker,
wherein, said time remaining before ingredients are to be added or said actual time to add ingredients are based on an output of said temperature sensor.

10. The automatic bread maker of claim 4, further comprising a temperature sensor for detecting a temperature of a dough in said bread maker,
wherein, said time remaining before ingredients are to be added or said actual time to add ingredients are based on an output of said temperature sensor.

11. The automatic bread maker of claim 2, further comprising a temperature sensor for detecting room temperature
wherein, the automatic bread maker selects one of a plurality of internal bread making programs, and controls said display to display one of the time remaining before ingredients are to be added and the actual time to add the ingredients based on which of said programs are selected.

12. The automatic bread maker of claim 3, further comprising a temperature sensor for detecting room temperature
wherein, the automatic bread maker selects one of a plurality of internal bread making programs, and controls said display to display one of the time remaining before ingredients are to be added and the actual time to add the ingredients based on which of said programs are selected.

13. The automatic bread maker of claim 4, further comprising a temperature sensor for detecting room temperature
wherein, the automatic bread maker selects one of a plurality of internal bread making programs, and controls said display to display one of the time remaining before ingredients are to be added and the actual time to add the ingredients based on which of said programs are selected.

* * * * *